(12) United States Patent
Jiang et al.

(10) Patent No.: US 12,219,505 B2
(45) Date of Patent: Feb. 4, 2025

(54) SIGNAL TRANSMITTING METHOD AND NETWORK EQUIPMENT

(71) Applicant: VIVO MOBILE COMMUNICATION CO.,LTD., Guangdong (CN)

(72) Inventors: Lei Jiang, Chang'an Dongguan (CN); Kai Wu, Chang'an Dongguan (CN); Zhi Lu, Chang'an Dongguan (CN); Xueming Pan, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 93 days.

(21) Appl. No.: 17/040,826

(22) PCT Filed: Feb. 15, 2019

(86) PCT No.: PCT/CN2019/075189
§ 371 (c)(1),
(2) Date: Sep. 23, 2020

(87) PCT Pub. No.: WO2019/179263
PCT Pub. Date: Sep. 26, 2019

(65) Prior Publication Data
US 2021/0022095 A1    Jan. 21, 2021

(30) Foreign Application Priority Data
Mar. 23, 2018   (CN) .......................... 201810247834.0

(51) Int. Cl.
*H04W 56/00* (2009.01)
*H04W 16/14* (2009.01)
(Continued)

(52) U.S. Cl.
CPC .......... *H04W 56/001* (2013.01); *H04W 16/14* (2013.01); *H04W 16/28* (2013.01); *H04W 72/0446* (2013.01)

(58) Field of Classification Search
None
See application file for complete search history.

(56) References Cited

U.S. PATENT DOCUMENTS

2004/0157645 A1* 8/2004 Smith .................... H01Q 1/246
                                                  455/562.1
2015/0288438 A1* 10/2015 Maltsev ................ H04W 16/28
                                                   455/101
(Continued)

FOREIGN PATENT DOCUMENTS

CN         104301273 A      1/2015

OTHER PUBLICATIONS

"Discussion on SS/PBCH block in NR unlicensed", 3GPP TSG RAN WG1 Meeting #92, Feb. 26, 2018.
(Continued)

*Primary Examiner* — Faruk Hamza
*Assistant Examiner* — Cassandra L Decker
(74) *Attorney, Agent, or Firm* — BROOKS KUSHMAN P.C.

(57) ABSTRACT

The present disclosure provides a signal transmitting method and a network equipment. The signal transmitting method includes: performing channel detection on a time domain transmission unit on an unlicensed band; transmitting a synchronization signal block (SSB) according to a detection result of the channel detection, wherein the time domain transmission unit comprises at least one SSB.

16 Claims, 6 Drawing Sheets

(51) Int. Cl.
*H04W 16/28* (2009.01)
*H04W 72/0446* (2023.01)

(56) References Cited

U.S. PATENT DOCUMENTS

| | | | |
|---|---|---|---|
| 2015/0365830 A1* | 12/2015 | Wei | H04W 24/10 |
| | | | 370/280 |
| 2016/0301556 A1 | 10/2016 | Nory et al. | |
| 2017/0118773 A1* | 4/2017 | Cariou | H04W 74/0816 |
| 2017/0280331 A1 | 9/2017 | Gou et al. | |
| 2018/0098335 A1* | 4/2018 | Sun | H04Q 11/04 |
| 2018/0139742 A1* | 5/2018 | Sun | H04B 7/04 |
| 2018/0235008 A1* | 8/2018 | Park | H04W 16/28 |
| 2018/0242232 A1* | 8/2018 | Chendamarai Kannan | |
| | | | H04W 72/0453 |
| 2019/0037509 A1* | 1/2019 | Li | H04W 56/001 |
| 2019/0053269 A1* | 2/2019 | Lei | H04W 28/26 |
| 2019/0059106 A1* | 2/2019 | Zhang | H04W 16/14 |
| 2019/0104416 A1* | 4/2019 | Yerramalli | H04W 72/20 |
| 2019/0132103 A1* | 5/2019 | Yang | H04L 5/0051 |
| 2019/0141693 A1* | 5/2019 | Guo | H04W 16/14 |
| 2019/0150198 A1* | 5/2019 | Sun | H04L 5/0048 |
| | | | 370/329 |
| 2019/0191460 A1* | 6/2019 | Chendamarai Kannan | |
| | | | H04W 74/0816 |
| 2019/0200389 A1* | 6/2019 | Li | H04B 7/0695 |
| 2019/0230703 A1* | 7/2019 | Lv | H04W 74/0808 |
| 2019/0246335 A1* | 8/2019 | Mukherjee | H04W 48/08 |
| 2019/0246410 A1* | 8/2019 | Zhang | H04W 72/0446 |
| 2019/0289636 A1* | 9/2019 | Bang | H04W 74/08 |
| 2020/0236708 A1* | 7/2020 | Li | H04W 72/0453 |
| 2020/0304188 A1* | 9/2020 | Wu | H04W 74/0808 |
| 2021/0058967 A1* | 2/2021 | Oteri | H04W 16/14 |

OTHER PUBLICATIONS

"Consideration on LBT in NR-based access to unlicensed spectrum" 3GPP TSG RAN WG1 Meeting #92, Feb. 26, 2018.
"Potential solutions for NR unlicensed operation" 3GPP TSG RAN WG1 Meeting #92, Feb. 26, 2018.
"Potential solutions and techniques for NR unlicensed" 3GPP TSG RAN WG1 Meeting #92, Feb. 26, 2018.
"Consideration on Synchronization Signal for NR Unlicensed" 3GPP TSG RAN WG1 Meeting 92, Feb. 26, 2018.
"Discussion on physical DL channel design in NR unlicensed spectrum" 3GPP TSG RAN WG1 Meeting #93, May 21, 2018.
Written Opinion and International Search Report in Application No. PCT/CN2019/075189 dated Oct. 8, 2020.

* cited by examiner

Fig. 1
Fig. 2
Fig. 3
Fig. 4

SIGNAL TRANSMITTING METHOD AND NETWORK EQUIPMENT

CROSS-REFERENCE TO RELATED APPLICATION

This application is the U.S. national phase of PCT Application No. PCT/CN2019/075189 filed on Feb. 15, 2019, which claims priority to Chinese Patent Application No. 201810247834.0 filed on Mar. 23, 2018, the disclosures of which are incorporated in their entirety by reference herein.

TECHNICAL FIELD

The present disclosure relates to the field of communications technology, and in particular to a signal transmitting method and a network equipment.

BACKGROUND

In a future communications system, the unlicensed band can be used as a supplement to the licensed band to help operators expand their services. In order to be consistent with the deployment of New Radio (NR) and maximize NR-based unlicensed access as much as possible, the unlicensed band can work in bands of 5 GHz, 37 GHz and 60 GHz. The large bandwidth (80 MHz or 100 MHz) of the unlicensed band can reduce the implementation complexity of base stations and User Equipments (UEs) (also called terminals). Since the unlicensed band is shared by multiple Radio Access Technologies (RATs), such as WiFi, radar, and Long Term Evolution Licensed-Assisted Access (LTE-LAA), etc., in some countries or regions the unlicensed band, when used, must comply with regulations to ensure that all devices can use the resource fairly; such as a regulation that channel detection must be performed before transmission, i.e., listen before talk (LBT), a regulation of maximum channel occupancy time (MCOT), and so on.

In an NR communication system, for initial access, Radio Resource Management (RRM) measurement, etc., the base station (i.e., gNB) needs to send Synchronization Signal Blocks (SSBs) for the UE to perform measurement evaluation, etc. The SSBs consist of New Radio Primary Synchronization Signal (NR-PSS)/New Radio Secondary Synchronization Signal (NR-SSS) and New Radio Physical Broadcast Channel (NR-PBCH), and are sent periodically by the base station. For CONNECTED/IDLE and non-standalone cases, the period of SSB can be configured as {5,10,20,40,80,160} ms. Regardless of the period, the SSBs in the synchronous signal (SS) burst set must be sent within a time window of 5 ms.

The above SSB transmission mechanism is applicable to the licensed band, and the base station can send SSBs periodically. In the unlicensed band, due to the uncertainty of channel, the transmission of SSB can no longer be guaranteed. Considering that the actual transmission time of SSB is relatively short, the LBT of one Clear Channel Assessment (CCA) can reasonably increase the transmission opportunity of SSB. However, in NR, different SSBs may be transmitted in different spatial directions, thus the technical solutions in the related art cannot solve the problem of transmitting the NR SSBs in unlicensed band. Other communication systems also have similar problems.

SUMMARY

The embodiments of the present disclosure provides a signal transmitting method and a network equipment to solve the problem of affecting the RRM measurement and the initial access in the terminal, which is caused by the fact that different SSBs may be transmitted in different spatial directions and there is no solution for transmitting the SSBs in the unlicensed band in the related art.

In a first aspect, an embodiment of the present disclosure provides a signal transmitting method applied to a network equipment, including:
  performing channel detection on a time domain transmission unit, on an unlicensed band;
  transmitting a synchronization signal block (SSB) according to a detection result of the channel detection;
  wherein the time domain transmission unit includes at least one SSB.

In a second aspect, an embodiment of the present disclosure further provides a network equipment including:
  a detection module configured to perform channel detection on a time domain transmission unit, on an unlicensed band;
  a transmitting module configured to transmit a synchronization signal block (SSB) according to a detection result of the channel detection;
  wherein the time domain transmission unit includes at least one SSB.

In a third aspect, an embodiment of the present disclosure further provides a network equipment including: a storage, a processor, and a computer program stored on the storage and capable of running on the processor, the computer program implementing, when executed by the processor, the steps of the above signal transmitting method.

In a fourth aspect, an embodiment of the present disclosure further provides a computer readable storage medium having a computer program stored thereon, the computer program implementing, when executed by a processor, the steps of the above signal transmitting method.

The beneficial effects of the embodiments of the present disclosure are as follows: by performing channel detection on the time domain transmission unit on the unlicensed band, and sending the synchronization signal block (SSB) according to the detection result of the channel detection, the network communication process is improved, the normal RRM measurement and initial access of the terminal are ensured, thus improving the reliability of network communication.

BRIEF DESCRIPTION OF THE DRAWINGS

In order to explain the technical solutions of the embodiments of the present application more clearly, the accompanying drawings used in the embodiments or the description of the related art will be described briefly below. Obviously, the drawings in the following description are only some embodiments recited in the present application. For those of ordinary skill in the art, other drawings may be obtained based on these drawings without creative labor.

FIG. 1 shows a schematic diagram of a pattern of SSB with a subcarrier space of 15 kHz;

FIG. 2 shows a schematic diagram of a first pattern of SSB with a subcarrier space of 30 kHz;

FIG. 3 shows a schematic diagram of a second pattern of SSB with a subcarrier space of 30 kHz;

FIG. 4 shows a schematic diagram of a pattern of SSB with a subcarrier space of 120 kHz;

DETAILED DESCRIPTION

Hereinafter, the technical solutions in the embodiments of the present disclosure will be described clearly and thoroughly in conjunction with the drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts should fall within the protection scope of the present disclosure.

The terms "first", "second", etc. in the specification and claims of this application are used to distinguish similar objects, and are not necessarily used to describe a specific sequence or priority. It should be understood that the data used in this way can be interchanged under appropriate circumstances so that the embodiments of the present application described herein, for example, can be implemented in a sequence other than those illustrated or described herein. In addition, the terms "comprising and "having" and any variations thereof are intended to cover non-exclusive inclusions. For example, processes, methods, systems, products or devices that include a series of steps or units is not necessarily limited to those clearly listed steps or units, but may include other steps or units that are not clearly listed or are inherent to these processes, methods, products, or devices. In addition, the use of "and/or" in the specification and claims means at least one of the connected objects, for example, A and/or B, which means three situations: A is included alone, B is included alone, and both A and B are included.

In the embodiments of the present disclosure, words such as "exemplary" or "for example" are used to represent examples, illustrations, or explanations. Any embodiment or design solution described as "exemplary" or "for example" in the embodiments of the present disclosure should not be construed as being more advantageous than other embodiments or design solutions. To be precise, the use of word "exemplary" or "for example" or the like is intended to present related concepts in a specific manner.

The following describes embodiments of the present disclosure in conjunction with the drawings. The signal transmitting method and the network equipment provided by the embodiments of the present disclosure can be applied to a wireless communication system. The wireless communication system may be a system adopting a fifth generation (5G) mobile communication technology (hereinafter referred to as 5G system), and those skilled in the art can understand that the 5G NR system is only an example and not a limitation.

In the description of the embodiments of the present disclosure, some concepts used in the following description are first explained.

Figures 1, 2, 3, 4:
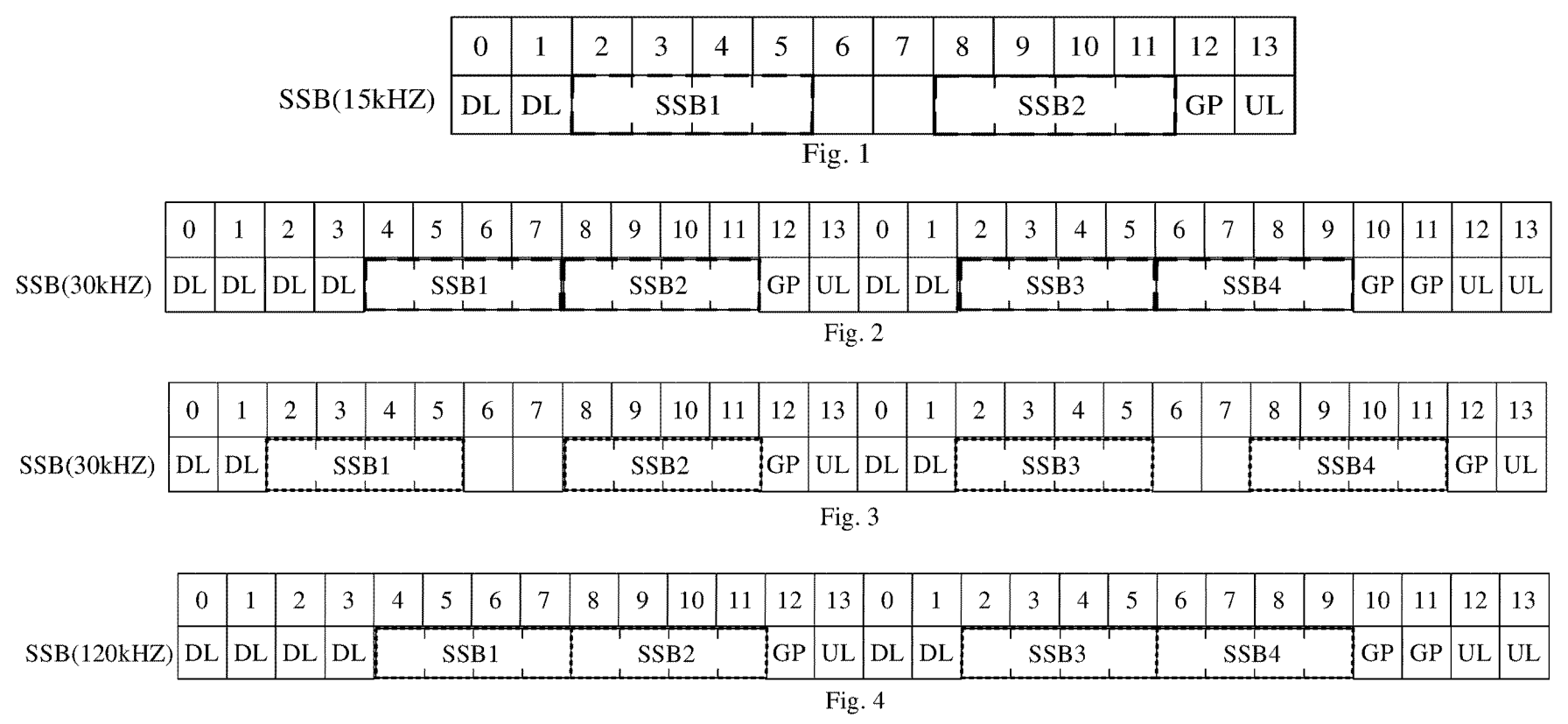
Figure 5:
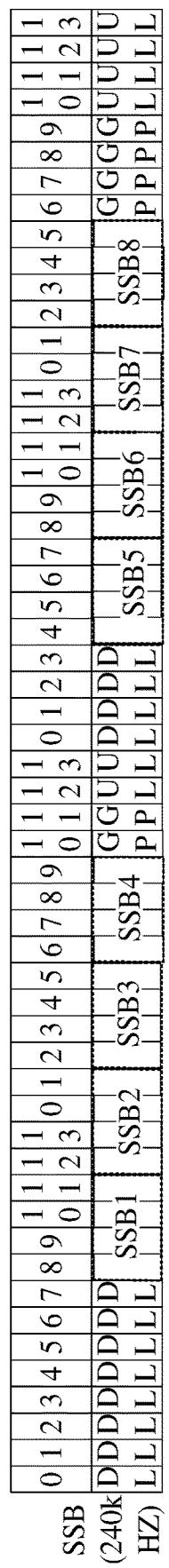
FIG. 5 shows a schematic diagram of a pattern of SSB with a subcarrier space of 240 kHz.

The subcarrier space of SSB of low frequency band (a frequency band below 6 GHz) may be 15 kHz/30 kHz, and at least one or two symbols at the beginning in a slot of 14 symbols are reserved for downlink (DL) control. At least 2 symbols at the end are reserved for guard period (GP) and uplink (UL) control. There are at most two possible SSB time locations in a slot of 14 symbols. In the high frequency band (a frequency band higher than 6 GHz), the subcarrier space of SSB is 120 kHz/240 kHz. When the subcarrier space of the SSB is 120 kHz, at least 2 symbols at the beginning in a slot of 14 symbols are reserved for DL control. At least 2 symbols at the end are reserved for guard period (GP) and UL control. There are at most two possible SSB time locations in a slot of 14 symbols. When the subcarrier space of SSB is 240 kHz, the SSBs will be mapped to two consecutive slots of 14 symbols. At least 4 symbols at the beginning in the first slot are reserved for DL control. At least 4 symbols at the end of the second slot are reserved for guard period and UL control. There are at most 4 possible SSB time locations in two consecutive slots of 14 symbols. The transmission patterns of SSB in the related art are shown in FIGS. 1 to 5, where FIG. 1 is a schematic diagram of a pattern of SSB with a subcarrier space of 15 kHz, FIG. 2 is a schematic diagram of a first pattern of SSB with a subcarrier space of 30 kHz, FIG. 3 is a schematic diagram of a second pattern of SSB with a subcarrier space of 30 kHz, FIG. 4 is a schematic diagram of a pattern of SSB with a subcarrier space of 120 kHz, FIG. 5 is a schematic diagram of a pattern of SSB with a subcarrier space of 240 kHz. Among them, different SSBs can be transmitted by beamforming in different directions, and each SSB corresponds to a beam, and the beam can also be called a spatial domain transmission filter.

On the unlicensed band, there are two types of downlink channel access procedures. One is LBT based on backoff mechanism, which is applicable to Physical Downlink Control Channel (PDCCH)/Physical Downlink Shared Channel (PDSCH)/Enhanced Physical Downlink Control Channel (EPDCCH); when a channel is detected to be idle during the defer duration and counter N is zero, the base station can start a transmission. Another access mechanism is for the discovery signal (not including data transmission). When the channel is detected to be idle in one clear channel assessment (CCA), it can immediately start a transmission of no more than 1 ms. The base station also needs to perform channel detection before transmitting the SSB. At least one of the two channel access mechanisms must be satisfied. The parameters of the channel access mechanism may be adjusted according to the frequency band where the SSB is located or the subcarrier space of SSB.

In the embodiments of the present disclosure, channel detection is performed on the transmission direction of each SSB in the time domain transmission unit before a time domain transmission unit, and corresponding SSBs are sequentially transmitted in the transmission directions in which the channel is detected to be idle in the time domain transmission unit; a channel reservation signal is transmitted in all transmission directions of SSB in which transmission is not performed and the channel is idle.

Figure 6:
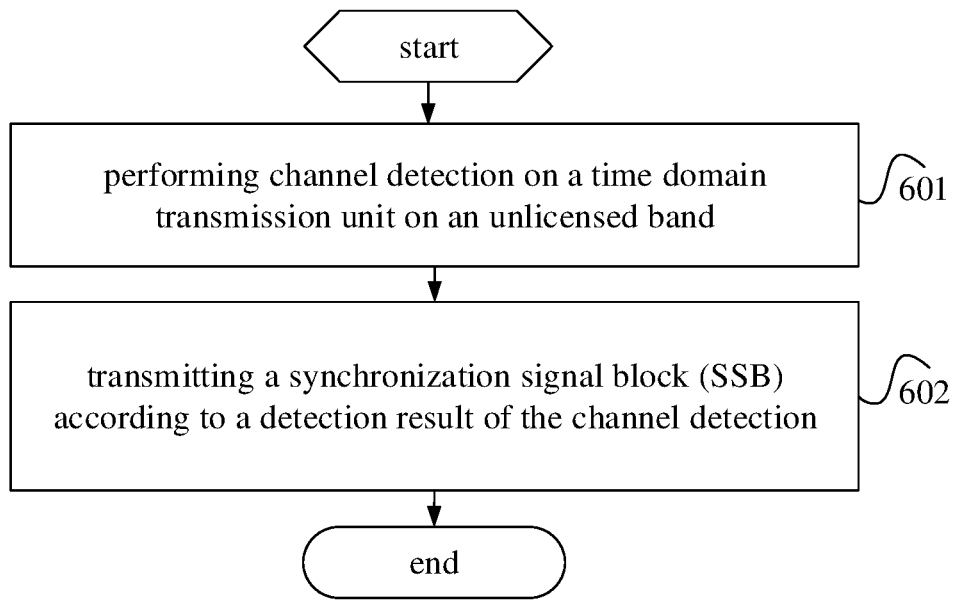
FIG. 6 shows a schematic diagram of a flowchart of a signal transmitting method according to an embodiment of the present disclosure.

Specifically, as shown in FIG. 6, it is a schematic diagram of a flowchart of a signal transmitting method according to an embodiment of the present disclosure. The signal transmitting method is applied to a network equipment and includes:

Step 601, performing channel detection on a time domain transmission unit, on an unlicensed band;

It should be noted that, the channel detection here refers to perform LBT on the time domain transmission unit. The time domain transmission unit includes at least one synchronization signal block (SSB), that is, the smallest unit of the time domain transmission unit may be the transmission time of one SSB, that is, 4 Orthogonal Frequency Division Multiplexing (OFDM) symbols.

Step 602, transmitting a synchronization signal block (SSB) according to a detection result of the channel detection;

It should be noted that, on the unlicensed band, when it is listened, according to the detection result of the time domain transmission unit, that a channel in a transmission direction of a target SSB is idle, the target SSB is transmitted in the transmission direction of the target SSB within the OFDM symbols of the target SSB, thereby achieving the transmission of the SSB on the unlicensed band.

Furthermore, the network equipment may specifically perform the channel detection as follows: performing channel detection in a transmission direction of at least one SSB contained in the time domain transmission unit.

It should be noted here that, when performing channel detection on these SSBs, the network equipment needs to perform channel detection in the transmission directions of the SSBs. The time domain transmission unit may contain only one SSB, or two SSBs, or more than two SSBs. When the time domain transmission unit has only one SSB, the network equipment simply needs to perform channel detection in the transmission direction of this SSB; when the time domain transmission unit has two SSBs or more than two SSBs, the network equipment needs to perform channel detection in the transmission direction of each of the SSBs, in other words, no matter how many SSBs are contained in the time domain transmission unit, the network equipment needs to perform channel detection in the transmission directions of all the SSBs contained in the time domain transmission unit.

Because the content contained in the time domain transmission unit is different, the specific implementation of the signal transmitting method in the embodiment of the present disclosure will also be different. Hereinafter, from the perspective of the specific content contained in the time domain transmission unit, the specific implementations of the embodiment of the present disclosure are described as follows.

I. The time domain transmission unit contains only one SSB

In this case, the network equipment needs to perform channel detection before each SSB is transmitted.

Figure 7:
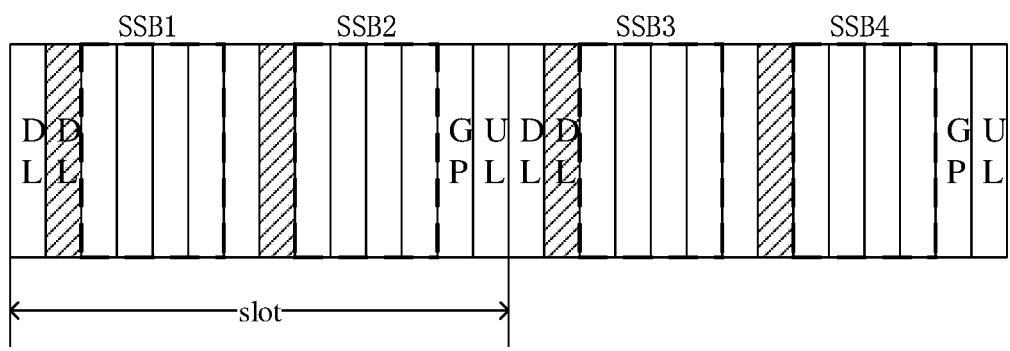
FIG. 7 shows a schematic diagram of a detection mode of a network equipment when a time domain transmission unit contains only one SSB.

For example, for the SSB transmission pattern of 15 kHz or the second SSB transmission pattern of 30 kHz, the time domain transmission unit may be 4 OFDM symbols. Before transmitting each SSB, the network equipment listens in the transmission direction of the SSB. Specifically, as shown in FIG. 7, the network equipment performs channel detection in an OFDM symbol before each SSB. A dotted box in FIG. 7 represents a time domain transmission unit, and the time domain transmission unit contains only one SSB. A slash-filled box represents an OFDM symbol that the time domain transmission unit listens to.

It should be noted here that, because the transmission time of SSB is very short, channel detection of one clear channel assessment (CCA) (for example, one shot LBT) may be used without backoff. The channel detection time may be 25 μs or less, for example, 16 μs, or 9 μs.

II. The time domain transmission unit contains at least two SSBs

It should be noted that, when the time domain transmission unit contains at least two SSBs, an implementation of Step 601 may be as follows:

performing channel detection in transmission directions of the at least two SSBs simultaneously.

In this case, the at least two SSBs may be consecutive SSBs, or may be discontinuous SSBs. Digital beamforming is adopted for each of the at least two SSBs, that is, only the SSBs of low frequency band can realize simultaneous channel detection in the transmission directions of multiple SSBs.

Specifically, in this case, a specific implementation of Step 602 is:

when it is listened that a channel in a transmission direction of at least one second SSB after a first SSB among the at least two SSBs is idle, transmitting a channel reservation signal of the at least one second SSB in the transmission direction of the at least one second SSB within orthogonal frequency division multiplexing (OFDM) symbols of the first SSB.

Figure 8:
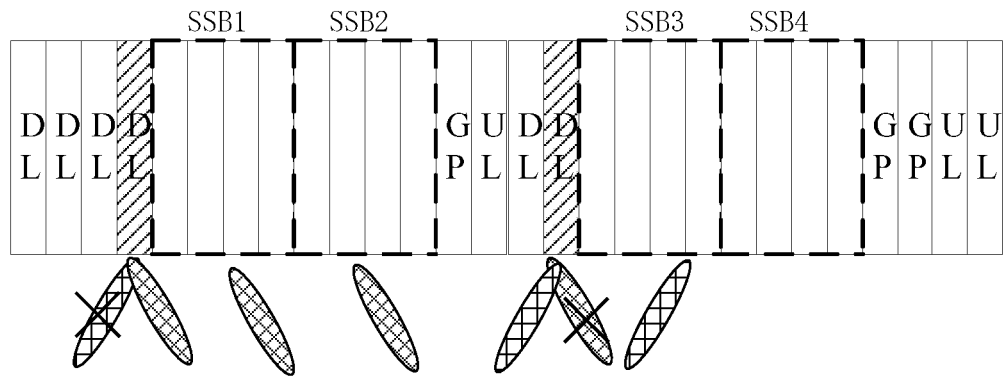
FIG. 8 shows a schematic diagram of a detection mode and SSB transmission for SSB with a subcarrier space of 30 kHz when a time domain transmission unit contains two consecutive SSBs.

For example, for the SSB patterns shown in FIGS. 1 to 3, the time transmission unit may be selected as multiple consecutive SSBs. The network equipment simultaneously performs channel detection in the transmission directions of multiple SSBs before the time domain transmission unit, and transmits SSB in a direction where the channel is idle. Specifically, as shown in FIG. 8, it shows an SSB pattern with a subcarrier space of 30 kHz. Since the frequency band below 6 GHz may be used for digital beamforming, the network equipment can transmit and receive in different directions. Before every two consecutive SSBs, channel detection is performed on the transmission directions of SSBs simultaneously. In FIG. 8, before the transmission of SSB1 and SSB2, the transmission directions of SSB1 and SSB2 are listened to. When the channel detection result of the transmission direction of SSB1 is busy, and the channel detection result of the transmission direction of SSB2 is idle, the SSB1 cannot be transmitted while the SSB2 can be transmitted. However, in order to prevent the channel for SSB2 from being occupied by other Radio Access Technologies (RAT) or other transmission nodes during the transmission time of SSB1, any channel reservation signal may be transmitted in the transmission direction of SSB2 within OFDM symbols of SSB1. If it is detected that the SSB whose channel is busy is the latter of two consecutive SSBs, the former SSB is transmitted normally, and the latter SSB is not transmitted, as shown in SSB3 and SSB4 in FIG.

8, where the slash-filled boxes represent OFDM symbols that the time domain transmission unit listens to.

Figure 9:
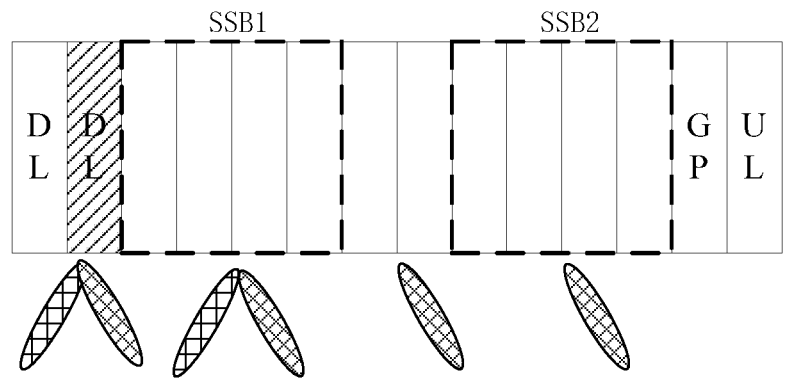
FIG. 9 shows a schematic diagram of a detection mode and SSB transmission for SSB with a subcarrier space of 30 kHz when a time domain transmission unit contains two discontinuous SSBs.

It should also be noted that for low frequency SSBs, the time domain transmission unit may also be selected as multiple discontinuously transmitted SSBs, as shown in FIG. 9. In FIG. 9, two discontinuous SSBs are selected as a time domain transmission unit for detection, that is to say, the duration of the time domain transmission unit is from the start symbol of SSB1 to the end symbol of SSB2. If the channels in the transmission directions of SSB1 and SSB2 are both idle, then within OFDM symbols of SSB1, SSB1 is transmitted in the transmission direction of SSB1, and the channel reservation signal is transmitted in the transmission direction of SSB2. Within the symbols between the SSB1 and the SSB2, the channel reservation signal is transmitted in the transmission direction of SSB2, and SSB2 is transmitted within OFDM symbols of SSB2, where the slash-filled box represents an OFDM symbol for time domain transmission unit detection.

Figure 10:
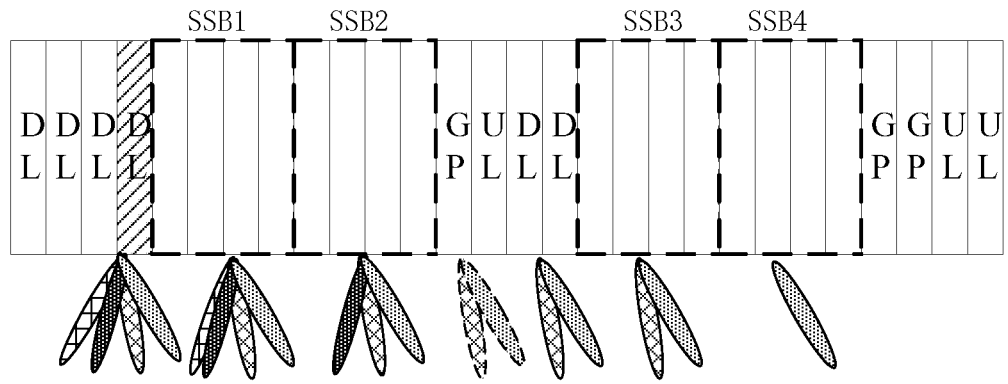
FIG. 10 shows a schematic diagram of a detection mode and SSB transmission for SSB when a time domain transmission unit contains four SSBs.

If the length of the time domain transmission unit is greater than one slot, for example, spans two time slots, as shown in FIG. 10, the time domain transmission unit is selected as being from the start OFDM symbol of SSB1 to the end OFDM symbol of SSB4. If channels in all transmission directions are detected as idle, the network equipment must transmit channel reservation signals in the transmission directions of all SSBs that are not transmitted at the same time when transmitting the SSBs. The channel reservation signals are also transmitted on the DL symbols between SSBs. No transmission is performed or no channel reservation signal is transmitted in the reserved gaps or UL OFDM symbols. It should be noted that, when the channels in the transmission directions of some SSBs are detected as busy, the SSBs in the transmission directions may not be transmitted, and only the channel reservation signals in the transmission directions of the SSBs whose channels are detected as idle are transmitted, where the slash-filled box in the figure represents an OFDM symbol for time domain transmission unit detection.

It should be noted that, when the time domain transmission unit contains at least two SSBs, another implementation of Step 601 may be as follows:

performing channel detection in the transmission directions of the at least two SSBs sequentially.

It should be noted that, in this case, the at least two SSBs may be consecutive SSBs, or may be discontinuous SSBs. Either digital beamforming or analog beamforming is adopted for the at least two SSBs. However, it should be noted here that, since the SSB of high frequency band adopts analog beamforming, only one direction of beam can be sent at the same time, and the network equipment cannot perform channel detection in all directions at one time. Thus, for at least two SSBs of high frequency band, the network equipment needs to perform channel detection in the transmission directions of individual SSBs sequentially; for the SSB of low frequency band, the network equipment can either perform channel detection in the transmission direction of each SSB simultaneously, or perform channel detection in the transmission directions of individual SSBs sequentially.

Specifically, when analog beamforming is adopted for each of the at least two SSBs, a specific implementation of Step 602 is:

when it is listened that a channel in a transmission direction of a third SSB among the at least two SSBs is busy and there is a fourth SSB after the third SSB, transmitting a channel reservation signal of the fourth SSB in a transmission direction of the fourth SSB within OFDM symbols of the third SSB.

Figure 11:
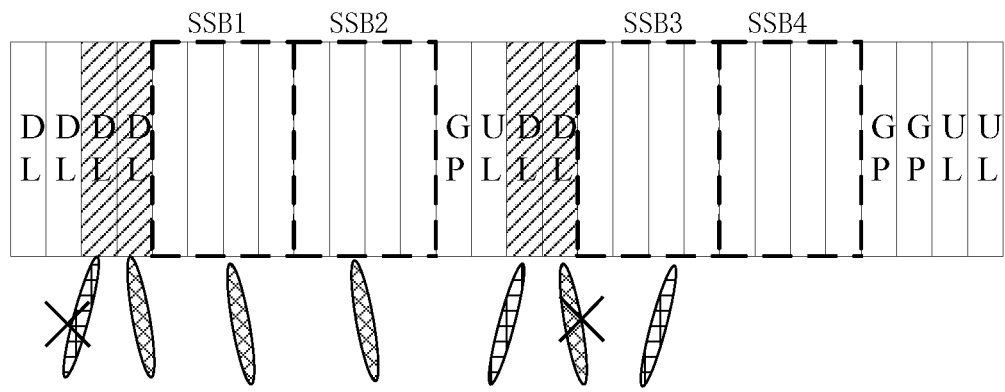
FIG. 11 shows a schematic diagram of a detection mode and SSB transmission for SSB of high frequency band.

For example, for the SSBs of high frequency band, channel detection may be performed in the transmission directions of individual SSBs sequentially before the time domain transmission unit, and then the SSB may be transmitted in the transmission direction where the channel is idle, as shown in FIG. 11. If the transmission direction of SSB1 is busy, the channel reservation signal may be transmitted in the transmission direction of SSB2 within OFDM symbols of SSB1, where the slash-filled boxes in the figure represent OFDM symbols that the time domain transmission unit listens to.

III. The time domain transmission unit includes the SSB and physical downlink control channel (PDCCH)

It should be noted that, in this case, a specific implementation of Step 601 is:

performing channel detection in transmission directions of the PDCCH and the SSB in the time domain transmission unit.

Figure 12:
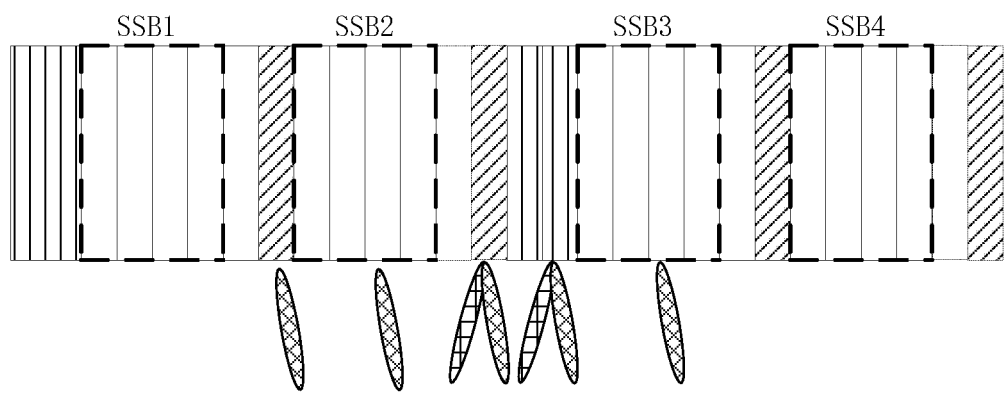
FIG. 12 shows a schematic diagram of a detection mode and SSB transmission for a network equipment when a time domain transmission unit contains the PDCCH and the SSB.

For example, when the network equipment has a PDCCH to be transmitted, the time domain transmission unit may include PDCCH and SSB. As shown in FIG. 12, taking a pattern of SSB with a subcarrier space of 15 kHz or a second pattern of SSB with a subcarrier space of 30 kHz as an example, for the first SSB of each slot, channel detection is performed in the transmission direction of the PDCCH and the transmission direction of the SSB in the last OFDM symbol of the previous slot. For the second SSB in a slot, channel detection is performed within OFDM symbols of the second SSB before the SSB in a slot. Wherein, the vertical filled boxes in FIG. 12 represent PDCCH transmission symbols, the dash-dotted boxes represent intervals and PUCCH transmission symbols, and the slash-filled boxes are OFDM symbols that are listened by the time domain transmission unit.

It should be noted here that, if the transmission direction of the PDCCH is the same as the transmission direction of the first SSB in the slot, only one direction of channel detection is required. For the first pattern of SSB with a subcarrier space of 30 kHz, the detection method is similar, and will not be repeated here.

IV. The time domain transmission unit includes the SSB and a PDCCH and a physical downlink sharing channel (PDSCH) of target information It should be noted that, in this case, a specific implementation of Step 601 is:

performing channel detection in transmission directions of the PDCCH and the PDSCH of the target information and the SSB in the time domain transmission unit, wherein the target information includes at least one of: remaining minimum system information (RMSI), other system information (OSI), and paging signaling.

It should be noted that, for the time domain transmission unit of this format, channel detection is performed simultaneously or sequentially for the transmission directions of these signals when detection, and then time division multiplexing (TDM) or frequency division multiplexing (FDM) is used to transmit these signals.

It should also be noted that, Step 601 in the embodiment of the present disclosure may also be implemented as follows:

performing omnidirectional channel detection or sector channel detection on the time domain transmission unit;

wherein the omnidirectional channel detection adopts an omnidirectional antenna for detection;

the sector channel detection adopts a sector antenna for detection.

Figure 13:
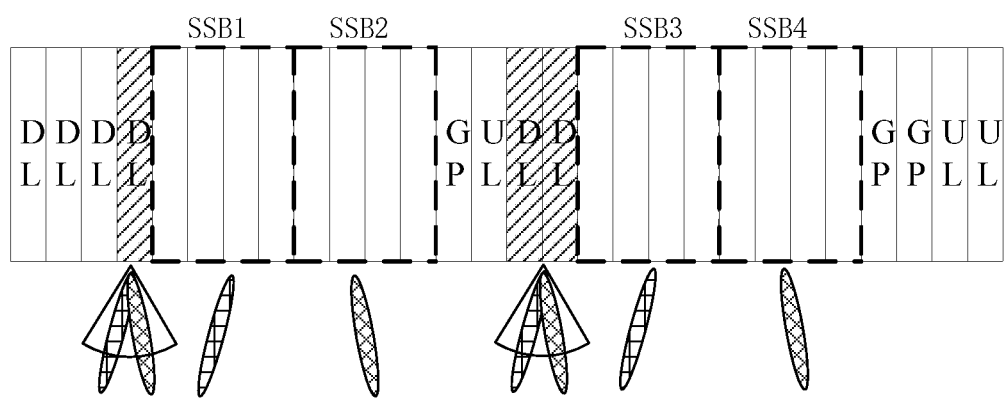
FIG. 13 shows a schematic diagram of a detection mode and SSB transmission when a network equipment performs omnidirectional channel detection or sector channel detection.

For example, as shown in FIG. 13, omnidirectional channel detection or sector channel detection is performed on the DL symbols before the time domain transmission unit. When the channel is listened to be idle, all the SSBs in the time domain transmission unit can be transmitted. It should be noted that, when performing sector channel detection, the direction of the sector needs to cover the transmission directions of all the SSBs in the time domain transmission unit, where the slash-filled boxes represent OFDM symbols that the time domain transmission unit listens to.

It should be noted that, for directional transmission, it is assumed that ED is a power detection threshold set based on a gain of the spatial domain transmission filter. When adopting omnidirectional channel detection or sector channel detection, since the gain of the omnidirectional antenna or sector antenna is different from a gain based on the spatial domain transmission filter, it is necessary to adjust the power detection threshold or power detection method to match the channel detection with the transmitted power matched.

For ease of implementation, in the embodiment of the present disclosure, without changing the power detection threshold, a detection time of omnidirectional channel detection or sector channel detection is acquired as follows: the detection time of the omnidirectional channel detection or the sector channel detection is acquired according to a difference between the gain of the target antenna, and the gain of the SSB based on the spatial domain transmission filter, wherein the target antenna is: an omnidirectional antenna or a sector antenna.

For example, assuming that a CCA slot based on the spatial domain transmission filter is 25 µs, the antenna gain of the spatial domain transmission filter is 3 dB larger than the gain of the sector antenna. In order to compensate for the antenna gain difference of 3 dB, the time of the CCA slot may be adjusted to 50 µs.

In addition, it should also be noted that, in the embodiment of the present disclosure, the channel detection can not only use one CCA channel detection, but also can use channel detection based on the backoff mechanism when the time domain transmission unit is long.

It should be noted that, the above embodiment of the present disclosure can solve the problem of transmitting SSBs on unlicensed bands, thereby improving the network communication process, ensuring the normal RRM measurement and initial access of the terminal, and improving the reliability of network communication.

Figure 14:
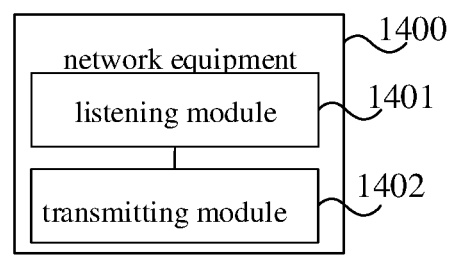
FIG. 14 is a schematic diagram of modules of a network equipment according to an embodiment of the present disclosure.

As shown in FIG. 14, an embodiment of the present disclosure further provides a network equipment 1400, which includes:
  a detection module 1401 configured to perform channel detection on a time domain transmission unit, on an unlicensed band;
  a transmitting module 1402 configured to transmit a synchronization signal block (SSB) according to a detection result of the channel detection;
  wherein the time domain transmission unit includes at least one SSB.
  Optionally, the detection module 1401 is configured to:
  perform channel detection in a transmission direction of at least one SSB contained in the time domain transmission unit.
  Optionally, when the time domain transmission unit includes at least two SSBs, the detection module 1401 is configured to:

perform channel detection in transmission directions of the at least two SSBs simultaneously.
  Specifically, digital beamforming is adopted for each of the at least two SSBs.
  Optionally, the transmitting module 1402 is configured to:
  when it is listened that a channel in a transmission direction of at least one second SSB after a first SSB among the at least two SSBs is idle, transmit a channel reservation signal of the at least one second SSB in the transmission direction of the at least one second SSB within orthogonal frequency division multiplexing (OFDM) symbols of the first SSB.
  Optionally, when the time domain transmission unit includes at least two SSBs, the detection module 1401 is configured to:
  perform channel detection in transmission directions of the at least two SSBs sequentially.
  Further, when analog beamforming is adopted for each of the at least two SSBs, the transmitting module 1402 is configured to:
  when it is listened that a channel in a transmission direction of a third SSB among the at least two SSBs is busy and there is a fourth SSB after the third SSB, transmitting a channel reservation signal of the fourth SSB in a transmission direction of the fourth SSB within OFDM symbols of the third SSB.
  Optionally, when the time domain transmission unit further includes a physical downlink control channel (PDCCH), the detection module 1401 is configured to:
  perform channel detection in transmission directions of the PDCCH and the SSB in the time domain transmission unit.
  Optionally, when the time domain transmission unit further includes a PDCCH and a physical downlink sharing channel (PDSCH) of target information, the detection module 1401 is configured to:
  perform channel detection in transmission directions of the PDCCH and the PDSCH of the target information and the SSB in the time domain transmission unit, wherein the target information includes at least one of: remaining minimum system information (RMSI), other system information (OSI), and paging signaling.
  Optionally, the detection module 1401 is configured to:
  perform omnidirectional channel detection or sector channel detection on the time domain transmission unit;
  wherein the omnidirectional channel detection adopts an omnidirectional antenna for detection, and the sector channel detection adopts a sector antenna for detection.
  Further, a detection time of the omnidirectional channel detection or the sector channel detection is acquired as follows: the detection time of the omnidirectional channel detection or the sector channel detection is acquired according to a difference between a gain of a target antenna, and a gain of the SSB based on a spatial domain transmission filter;
  wherein the target antenna is: an omnidirectional antenna or a sector antenna.
  Further, the channel detection adopts one of: channel detection of one clear channel assessment (CCA) and channel detection based on backoff mechanism.
  Further, the transmitting module 1402 is configured to:
  when it is listened that a channel in a transmission direction of a target SSB is idle, transmit the target SSB in the transmission direction of the target SSB within OFDM symbols of the target SSB.
  It should be noted that, this network equipment embodiment is a network equipment corresponding to the above signal transmitting method applied to the network equipment side. All the implementations of the above-mentioned embodiment are applicable to this network equipment embodiment, and can also achieve the same technical effects.

An embodiment of the present disclosure further provides a network equipment including: a storage, a processor, and a computer program stored on the storage and capable of running on the processor; the computer program implements, when executed by the processor, the processes in the above signal transmitting method embodiment applied to a network equipment, and can achieve the same technical effects. To avoid repetition, they will not be described again here.

An embodiment of the present disclosure further provides a computer readable storage medium, wherein the computer readable storage medium stores a computer program thereon, and when executed by a processor, the computer program implements the processes in the above signal transmitting method embodiment applied to a network equipment, and can achieve the same technical effects. To avoid repetition, they will not be described again here. The computer readable storage medium may be such as a Read-Only Memory (ROM), a Random Access Memory (RAM), a magnetic disks or an optical disks, etc.

Figure 15:
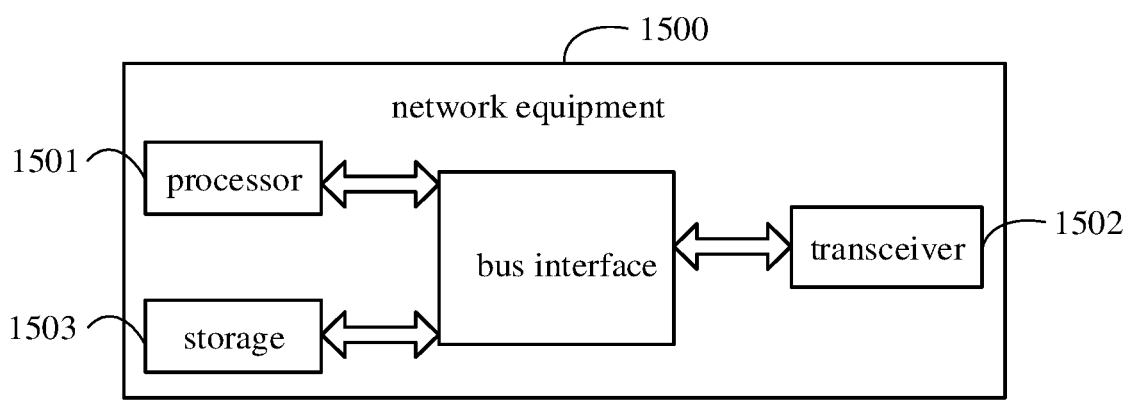
FIG. 15 is a structural block diagram of a network equipment according to an embodiment of the present disclosure.

FIG. 15 is a structural diagram of a network equipment according to an embodiment of the present disclosure, which can implement the details of the above signal transmitting method applied to a network equipment side, and achieve the same effects. As shown in FIG. 15, the network equipment 1500 includes: a processor 1501, a transceiver 1502, a storage 1503 and a bus interface, wherein:

the processor 1501 is configured to read a program stored in the storage 1503 and perform the following processes:

performing channel detection on a time domain transmission unit, on an unlicensed band;

transmitting a synchronization signal block (SSB) via the transceiver 1502 according to a detection result of the channel detection;

wherein the time domain transmission unit includes at least one SSB.

In FIG. 15, the bus architecture may include any number of interconnected buses and bridges, which are linked together specifically by various circuits such as one or more processors represented by the processor 1001 and the storage represented by the storage 1003. The bus architecture can also link various other circuits such as peripheral devices, voltage regulators, and power management circuits, etc., which are well known in the art, and therefore, they will not be further described herein. The bus interface provides interfaces. The transceiver 1502 may be a plurality of elements, including a transmitter and a receiver, and provides units for communicating with various other devices on a transmission medium.

The processor 1501 is responsible for managing the bus architecture and general processing, and the storage 1503 may store data used by the processor 1501 when performing operations.

Optionally, the processor 1501 further reads the program stored in the storage 1503 to perform:

performing channel detection in a transmission direction of at least one SSB contained in the time domain transmission unit.

Optionally, when the time domain transmission unit includes at least two SSBs, the processor 1501 further reads the program stored in the storage 1503 to perform:

performing channel detection in transmission directions of the at least two SSBs simultaneously.

Wherein digital beamforming is adopted for each of the at least two SSBs.

Optionally, the processor 1501 further reads the program stored in the storage 1503 to perform:

when it is listened that a channel in a transmission direction of at least one second SSB after a first SSB among the at least two SSBs is idle, transmitting a channel reservation signal of the at least one second SSB in the transmission direction of the at least one second SSB within orthogonal frequency division multiplexing (OFDM) symbols of the first SSB.

Optionally, when the time domain transmission unit includes at least two SSBs, the processor 1501 further reads the program stored in the storage 1503 to perform:

performing channel detection in transmission directions of the at least two SSBs sequentially.

Optionally, when analog beamforming is adopted for each of the at least two SSBs, the processor 1501 further reads programs stored in the storage 1503 to perform:

when it is listened that a channel in a transmission direction of a third SSB among the at least two SSBs is busy and there is a fourth SSB after the third SSB, transmitting a channel reservation signal of the fourth SSB in a transmission direction of the fourth SSB within OFDM symbols of the third SSB.

Optionally, the processor 1501 further reads programs stored in the storage 1503 to perform:

performing channel detection in transmission directions of the PDCCH and the SSB in the time domain transmission unit.

Optionally, when the time domain transmission unit further includes a PDCCH and a physical downlink sharing channel (PDSCH) of target information, the processor 1501 further reads programs stored in the storage 1503 to perform:

performing channel detection in transmission directions of the PDCCH and the PDSCH of the target information and the SSB in the time domain transmission unit, wherein the target information includes at least one of: remaining minimum system information (RMSI), other system information (OSI), and paging signaling.

Optionally, the processor 1501 further reads programs stored in the storage 1503 to perform:

performing omnidirectional channel detection or sector channel detection on the time domain transmission unit;

wherein the omnidirectional channel detection adopts an omnidirectional antenna for detection, and the sector channel detection adopts a sector antenna for detection.

wherein a detection time of the omnidirectional channel detection or the sector channel detection is acquired as follows: the detection time of the omnidirectional channel detection or the sector channel detection is acquired according to a difference between a gain of a target antenna, and a gain of the SSB based on a spatial domain transmission filter; wherein the target antenna is: an omnidirectional antenna or a sector antenna.

Specifically, the channel detection adopts one of: channel detection of one clear channel assessment (CCA), and channel detection based on backoff mechanism.

Optionally, the processor 1501 further reads programs stored in the storage 1503 to perform:

when it is listened that a channel in a transmission direction of a target SSB is idle, transmitting the target SSB in the transmission direction of the target SSB within OFDM symbols of the target SSB via the transceiver 1502.

Wherein, the network equipment may be a base station (Base Transceiver Station, BTS) in Global System of Mobile communication (GSM) or Code Division Multiple Access (CDMA), or may be a base station (NodeB, NB) in (Wideband Code Division Multiple Access, WCDMA), or may also be a base station (Evolutional Node B, eNB or eNodeB) in LTE, or a relay station or access point, or a base station in a future 5G network etc., which is not limited here.

It should be noted that, the terms "comprising", "including" herein or any other variants thereof are intended to cover non-exclusive inclusion, so that processes, methods, articles or devices including a series of elements not only includes those elements, but also includes other elements not explicitly listed, or elements inherent to the processes, methods, articles, or devices. Without more restrictions, the element defined by the sentence "comprising a . . . " does not exclude that there are other identical elements in the process, method, article, or terminal equipment that includes the element.

With the description of the above embodiments, those skilled in the art can clearly understand that the methods in the above embodiments can be implemented by means of software plus a necessary general hardware platform, and of course, can also be implemented by hardware, but in many cases the former is a preferred implementation. Based on such an understanding, the essential technical solutions of the present disclosure, or part of the technical solutions that contributes to the related art, can be embodied in the form of a software product; the computer software product is stored in a storage medium (such as a ROM/RAM, a magnetic disk, or an optical disk), including several instructions used to cause a terminal (which may be a mobile phone, a computer, a server, an air conditioner, or a network equipment, etc.) to perform the methods described in various embodiments of the present disclosure.

The above are optional implementations of the present disclosure. It should be noted that, for those of ordinary skill in the art, many improvements and modifications can be made without departing from the principles described in this disclosure, and these improvements and modifications are also within the protection scope of this disclosure.

What is claimed is:

1. A signal transmitting method, applied to a network equipment, comprising:
    performing sector channel detection on a time domain transmission unit on an unlicensed band, to obtain detection results associated with at least two synchronization signal blocks (SSBs) configured in the same time domain transmission unit, transmission directions of the at least two SSBs being covered by a direction of a sector for the sector channel detection; and
    performing SSB transmission according to the detection results of the sector channel detection;
    wherein a detection time of the sector channel detection is acquired according to a difference between a gain of a sector antenna, and a gain of the SSB based on a spatial domain transmission filter.

2. The signal transmitting method according to claim 1, wherein the performing SSB transmission according to the detection results of the sector channel detection comprises:
    upon detecting that at least one second SSB in the at least two SSBs after a first SSB in the at least two SSBs is idle, transmitting, within orthogonal frequency division multiplexing (OFDM) symbols of the first SSB, a channel reservation signal of the at least one second SSB in a transmission direction of the at least one second SSB.

3. The signal transmitting method according to claim 1, wherein digital beamforming is adopted for each of the at least two SSBs.

4. The signal transmitting method according to claim 1, wherein in a case that analog beamforming is adopted for each of the at least two SSBs, the performing SSB transmission according to the detection results of the sector channel detection comprises:
    upon detecting that a channel in a transmission direction of a first SSB in the at least two SSBs is busy and that a channel in a transmission direction of a second SSB in the at least two SSBs which is after the first SSB is idle, transmitting, within OFDM symbols of the first SSB, a channel reservation signal of the second SSB in the transmission direction of the second SSB.

5. The signal transmitting method according to claim 1, wherein the performing SSB transmission according to the detection results of the sector channel detection comprises:
    upon detecting that a channel in a transmission direction of a target SSB in the at least two SSBs is idle, transmitting the target SSB in the transmission direction of the target SSB within OFDM symbols of the target SSB.

6. A non-transitory computer readable storage medium having a computer program stored thereon, the computer program implementing, when executed by a processor, the steps of a signal transmitting method according to claim 1.

7. The non-transitory computer readable storage medium according to claim 6, wherein in the signal transmitting method implemented by the computer program when executed by the processor, the performing SSB transmission according to the detection results of the sector channel detection further comprises:
    upon detecting that a channel in a transmission direction of at least one second SSB in the at least two SSBs after a first SSB in the at least two SSBs is idle, transmitting, within orthogonal frequency division multiplexing (OFDM) symbols of the first SSB, a channel reservation signal of the at least one second SSB in the transmission direction of the at least one second SSB.

8. The non-transitory computer readable storage medium according to claim 6, wherein in the signal transmitting method implemented by the computer program when executed by the processor, digital beamforming is adopted for each of the at least two SSBs.

9. The non-transitory computer readable storage medium according to claim 6, wherein in the signal transmitting method implemented by the computer program when executed by the processor, in a case that analog beamforming is adopted for each of the at least two SSBs, the performing SSB transmission according to the detection results of the sector channel detection comprises:
    upon detecting that a channel in a transmission direction of a first SSB in the at least two SSBs is busy and that a channel in a transmission direction of a second SSB in the at least two SSBs which is after the first SSB is idle, transmitting, within OFDM symbols of the first SSB, a channel reservation signal of the second SSB in the transmission direction of the second SSB.

10. A network equipment, comprising a storage, a processor, and a computer program stored on the storage and capable of running on the processor, the computer program implementing, when executed by the processor, the steps of a signal transmitting method, the signal transmitting method comprising:
　　performing sector channel detection on a time domain transmission unit on an unlicensed band, to obtain detection results associated with at least two synchronization signal blocks (SSBs) configured in the same time domain transmission unit, transmission directions of the at least two SSBs being covered by a direction of a sector for the sector channel detection; and
　　performing SSB transmission according to the detection results of the sector channel detection;
　　wherein a detection time of the sector channel detection is acquired according to a difference between a gain of a sector antenna, and a gain of the SSB based on a spatial domain transmission filter.

11. The network equipment according to claim 10, wherein in the signal transmitting method implemented by the computer program when executed by the processor, the performing SSB transmission according to the detection results of the sector channel detection further comprises:
　　upon detecting that a channel in a transmission direction of at least one second SSB in the at least two SSBs after a first SSB in the at least two SSBs is idle, transmitting, within orthogonal frequency division multiplexing (OFDM) symbols of the first SSB, a channel reservation signal of the at least one second SSB in the transmission direction of the at least one second SSB.

12. The network equipment according to claim 10, wherein in the signal transmitting method implemented by the computer program when executed by the processor, digital beamforming is adopted for each of the at least two SSBs.

13. The network equipment according to claim 10, wherein in the signal transmitting method implemented by the computer program when executed by the processor, in a case that analog beamforming is adopted for each of the at least two SSBs, the performing SSB transmission according to the detection results of the sector channel detection comprises:
　　upon detecting that a channel in a transmission direction of a first SSB in the at least two SSBs is busy and that a channel in a transmission direction of a second SSB in the at least two SSBs which is after the first SSB is idle, transmitting, within OFDM symbols of the first SSB, a channel reservation signal of the second SSB in the transmission direction of the second SSB.

14. The network equipment according to claim 10, wherein in the signal transmitting method implemented by the computer program when executed by the processor, the performing SSB transmission according to the detection results of the sector channel detection comprises:
　　upon detecting that a channel in a transmission direction of a target SSB in the at least two SSBs is idle, transmitting the target SSB in the transmission direction of the target SSB within OFDM symbols of the target SSB.

15. A signal transmitting method, applied to a network equipment, comprising:
　　performing sector channel detection on a time domain transmission unit on an unlicensed band, to obtain detection results associated with at least two synchronization signal blocks (SSBs) configured in the same time domain transmission unit, wherein transmission directions of the at least two SSBs-is are covered by a direction of a sector for the sector channel detection, and the at least two SSBs comprises a first SSB and at least one second SSB after the first SSB; and
　　performing SSB transmission according to the detection results of the sector channel detection, comprising:
　　upon detecting that the at least one second SSB is idle, transmitting, within orthogonal frequency division multiplexing (OFDM) symbols of the first SSB in the time domain transmission unit, a channel reservation signal of the at least one second SSB in a transmission direction of the at least one second SSB;
　　wherein the method further comprises:
　　obtaining, according to a difference between a gain of a sector antenna and a gain of a spatial domain transmission filter, a detection time of the sector channel detection without changing a power detection threshold which is set based on the gain of the spatial domain transmission filter.

16. The signal transmitting method according to claim 15, wherein obtaining the detection time of the sector channel detection comprises:
　　adjusting, by compensating for the difference between the gain of the sector antenna and the gain of the spatial domain transmission filter, a detection time for the spatial domain transmission filter to obtain the detection time of the sector channel detection.

\* \* \* \* \*